(12) United States Patent
Lutz et al.

(10) Patent No.: US 11,058,061 B2
(45) Date of Patent: Jul. 13, 2021

(54) TRANSPORT AND PROCESSING ROLLER FOR A HARVESTER

(71) Applicant: GEBRUEDER BUSATIS GESELLSCHAFT M.B.H., Purgstall an der Erlauf (AT)

(72) Inventors: Wolfgang Lutz, Wieselburg (AT); Markus Nadlinger, Euratsfeld (AT)

(73) Assignee: Gebrueder Busatis Gesellschaft m.b.H., Purgstall an der Erlauf (AT)

( * ) Notice: Subject to any disclaimer, the term of this patent is extended or adjusted under 35 U.S.C. 154(b) by 476 days.

(21) Appl. No.: 15/797,066

(22) Filed: Oct. 30, 2017

(65) Prior Publication Data

US 2018/0116117 A1    May 3, 2018

(30) Foreign Application Priority Data

Oct. 28, 2016   (AT) .............................. A 50991/2016

(51) Int. Cl.
| | | |
|---|---|---|
| *A01D 82/02* | (2006.01) | |
| *A01D 43/10* | (2006.01) | |
| *A01D 45/02* | (2006.01) | |
| *B02C 4/30* | (2006.01) | |
| *B02C 4/08* | (2006.01) | |

(52) U.S. Cl.
CPC .............. *A01D 82/02* (2013.01); *A01D 43/10* (2013.01); *A01D 45/02* (2013.01); *B02C 4/08* (2013.01); *B02C 4/305* (2013.01)

(58) Field of Classification Search
CPC ...... A01D 43/10; A01D 43/08; A01D 43/082; A01D 82/00; A01D 82/02; B02C 4/00; B02C 4/02; B02C 4/06; B02C 4/08; B02C 4/30; B02C 4/305
See application file for complete search history.

(56) References Cited

U.S. PATENT DOCUMENTS

| | | |
|---|---|---|
| 4,951,888 A | 8/1990 | Sharpe et al. |
| 5,201,917 A | 4/1993 | Brunet et al. |
| 6,215,093 B1 | 4/2001 | Meiners et al. |

(Continued)

FOREIGN PATENT DOCUMENTS

| | | |
|---|---|---|
| AT | 15071 U1 | 12/2016 |
| AU | 2002300967 B2 | 6/2003 |

(Continued)

*Primary Examiner* — Alicia Torres
(74) *Attorney, Agent, or Firm* — Laurence A. Greenberg; Werner H. Stemer; Ralph E. Locher (57) ABSTRACT

A conveying and conditioning roller for a harvesting machine is provided on the surface thereof with teeth in the form of toothed strips which extend over the longitudinal extent of the roller and in each case have a leading tooth flank and a trailing tooth flank as well as a tooth edge. The roller is provided with wear protection zones continuously or in partial regions, the wear resistance thereof being greater than that of the material of the base body of the roller. The base body has a tooth structure determining the shape of the teeth and tooth wear protection zones are formed on the trailing tooth flanks by a high energy radiation process, substantially maintaining the geometry of the tooth structure, roller wear protection zones being formed together thereby on the rollers, as well as a method for producing such a roller wear protection zone.

12 Claims, 5 Drawing Sheets

(56) References Cited

U.S. PATENT DOCUMENTS

| | | | |
|---|---|---|---|
| 6,615,936 B1* | 9/2003 | Mourik | B23K 15/0086 |
| | | | 175/374 |
| 8,807,554 B2* | 8/2014 | Mine | B65H 5/06 |
| | | | 271/109 |
| 9,284,848 B2 | 3/2016 | Richter | |
| 2002/0193194 A1* | 12/2002 | Okabe | F01L 1/022 |
| | | | 474/152 |
| 2003/0146318 A1* | 8/2003 | Condon | B02C 4/305 |
| | | | 241/236 |
| 2007/0266689 A1 | 11/2007 | Calmer | |
| 2009/0020638 A1 | 1/2009 | Becker et al. | |
| 2010/0043371 A1 | 2/2010 | Rieck et al. | |
| 2014/0166797 A1 | 6/2014 | Den Boer et al. | |
| 2014/0326811 A1* | 11/2014 | Daniels | B02C 4/08 |
| | | | 241/27 |
| 2016/0286725 A1* | 10/2016 | Vanden Broucke | B02C 4/30 |
| 2017/0043347 A1 | 2/2017 | Berglund et al. | |
| 2017/0118917 A1* | 5/2017 | Lutz | A01D 43/10 |
| 2019/0015837 A1* | 1/2019 | Irmak | B02C 4/08 |
| 2019/0119802 A1* | 4/2019 | Suidzu | B02C 4/305 |

FOREIGN PATENT DOCUMENTS

| | | |
|---|---|---|
| CN | 104004861 A | 8/2014 |
| DE | 69100258 T2 | 3/1994 |
| DE | 19649865 C1 | 2/1998 |
| DE | 102006008115 A1 | 8/2007 |
| DE | 102007059865 A1 | 6/2009 |
| DE | 102012111378 A1 | 5/2014 |
| EP | 0995352 A1 | 4/2000 |
| EP | 2476864 A1 | 7/2012 |
| EP | 2940169 A1 | 11/2015 |
| JP | 2009066715 A | 4/2009 |
| WO | 8600546 A1 | 1/1986 |
| WO | 2015075157 A1 | 5/2015 |

\* cited by examiner

TRANSPORT AND PROCESSING ROLLER FOR A HARVESTER

BACKGROUND OF THE INVENTION

Field of the Invention

The invention relates a conveying and conditioning roller for a harvesting machine having teeth comprising tooth edges provided on the surface thereof, wherein at least in the region of the tooth edges and/or tooth flanks of its teeth the roller has a wear protection zone which is continuous or divided into partial zones, the wear resistance thereof being greater than that of the material of the base body of the conveying and conditioning roller. The invention further relates to a method for producing a conveying and conditioning roller for a harvesting machine having teeth comprising tooth edges provided on the surface thereof. The invention further relates to the arrangement of two such rollers.

In harvesting machines for maize and whole plants, both as fodder and for biogas systems, after the cutting and chopping the harvested crop is guided through a device having conveying and conditioning rollers, which causes the grains to be broken up and thus permits the decomposition of the harvested crop. At the same time, the device serves for conveying the harvested crop. In these devices the chopped harvested crop is supplied to a pair of cylindrical conveying and conditioning rollers having teeth provided on the surface thereof, the tooth edges thereof extending parallel or obliquely to the longitudinal axis of the conveying and conditioning roller. The two rollers rotate in opposing directions, wherein one of the rollers has a higher rotational speed, for example increased by 20%. In order to be able to fulfill the function of breaking up the grains and the function of conveying the harvested crop effectively, the spacing between the tooth edges opposing one another in the friction gap of the two conveying and conditioning rollers has to be in a narrow predetermined range over the entire length and in any angular position of the rollers relative to one another, for example between 0.5 and 3 mm for maize.

Due to the conveying and conditioning operation, wear occurs on the tooth edges which leads to a rounding of the tooth edges. As a result, the spacing between the tooth edges increases in the gap between the two rollers and the function of breaking up the grains is lost. Whilst the spacing between the two parallel rotational axes of the rollers may be adjustable, a realignment is often not possible since the wear may be variable, viewed over the length of the rollers. Thus, for example, greater wear occurs at the two roller ends when more material is passed through here. The maximum wear thus dictates the replacement of the entire roller. Economical repair methods for conveying and conditioning rollers have not been known hitherto.

To reduce the wear, it is currently known in conveying and conditioning rollers to increase the wear resistance in the region of the tooth edges, for example by inductive hardening. Moreover, hard chromium-plated, nitrated or boron-treated conveying and conditioning rollers are commercially available but these rollers have the drawback of a continuous rounding of the tooth edges. The production of the conveying and conditioning rollers from more wear-resistant material such as hard cast steel is also possible. On the one hand, all of these methods are very expensive and, on the other hand, the service lives are still inadequate.

BRIEF SUMMARY OF THE INVENTION

It is the object of the present invention to provide a conveying and conditioning roller and the arrangement thereof, a more economical operation being possible by the use thereof, i.e. the production thereof is more cost-effective and/or the service life thereof is even longer, and to find a method for producing this conveying and conditioning roller.

To this end, a conveying and conditioning roller according to the invention for a harvesting machine is provided with teeth comprising tooth edges provided on the surface thereof, wherein at least in the region of the tooth edges and/or tooth flanks of its teeth, the roller has a wear protection zone which is continuous or divided into partial zones, the wear resistance thereof being greater than that of the material of the base body of the conveying and conditioning roller, characterized in that the base body has a tooth structure determining the shape of the teeth and the wear protection zone is produced by a high energy radiation method, substantially maintaining the geometry of the tooth structure.

Preferably, a conveying and conditioning roller is provided for a harvesting machine, wherein the roller is provided on the surface thereof with teeth in the form of toothed strips which extend over the longitudinal extent of the roller and in each case comprise a leading tooth flank and a trailing tooth flank as well as a tooth edge, and wherein the roller is provided with wear protection zones in a continuous manner or in partial regions, the wear resistance thereof being greater than that of the material of the base body of the roller, characterized in that the base body has a tooth structure determining the shape of the teeth and tooth wear protection zones are formed on the trailing tooth flanks by a high energy radiation method, substantially maintaining the geometry of the tooth structure, roller wear protection zones being formed together thereby on the rollers.

High energy radiation methods are characterized by a high energy density, so that during the production of the wear protection zone a short effective time of the high energy beam is sufficient and the material of the base body is only affected by up to 1 mm on the surface and/or in regions very close to the surface. In particular, in a pre-hardened material of the base body the high energy radiation method only results in a small reduction in hardness in the region of the heat influence zone. If the material of the base body is not hardened, the small penetration depth results in rapid cooling and thus in a hardening of the material of the base body and thus in a supporting effect for the wear protection zone. High energy radiation methods are sufficiently described in the literature. For example, reference might be made to DE 10 2007 059 865 A1, DE 196 49 865 C1 and EP 2 476 864 A1.

By the high energy radiation method a wear protection zone is produced which leads to a considerable lengthening of the service life, wherein the shape of the teeth is no longer substantially altered by the high energy radiation method. By this treatment in the vicinity of the end contour it is possible to obtain tooth edges in a simple manner and post-treatment is not necessary.

In the present description, the expression "wear protection zone" describes, on the one hand, the regions of each individual tooth protected against wear as the tooth wear protection zone and secondly the regions formed thereby of the roller as the roller wear protection zones. "Teeth" describes the toothed projections which are oriented approximately in the longitudinal direction of the cylinder surface of the rollers. These teeth may also be arranged obliquely or in a slightly curved manner relative to an axially parallel arrangement.

Advantageously, the wear protection zone has a wear resistance which is at least 10% greater and preferably at least 25% greater than the wear resistance of the material of the base body. In this case, the wear resistance and/or the abrasive wear resistance may be determined, for example, by the friction wheel method according to the ASTM G65 Standard.

The wear protection zone may be produced by converting the structure of the material of the base body in a hardening method or remelting method by means of a high energy beam. In this method, the material of the base body itself is altered in the region close to the surface by the high energy beam without the addition of material and thus the wear resistance is increased.

Alternatively, the wear protection zone may be produced by a coating, build-up welding, dispersing, alloying or melting method by means of a high energy beam. By this method an additional material is applied onto and/or incorporated into the surface of the base body.

Since in a high energy radiation method the energy input into the material of the base body is only up to approximately 1 mm in regions very close to the surface, and the optionally applied material thickness is very small, namely 0.05 to a maximum of 0.5 mm, preferably 0.1 to 0.4 mm, particularly preferably 0.2 to 0.3 mm, it does not lead to any substantial alteration in the shape of the teeth.

According to the invention, the wear protection zone may contain hard material particles. A rough surface may be achieved by angular hard material particles, in particular with large hard material particles, said rough surface ensuring a good grip of the harvested crop during the breaking-up process and a good conveying action on the harvested crop flow.

Preferably, the wear protection zone is a hard material coating applied by a build-up welding method. The formation of the rough surface is further promoted by the hard material particles protruding from the matrix material by the rapid hardening process.

In this case, the hard material coating applied by a build-up welding method advantageously contains hard material particles embedded in a matrix material and having a size of between 40 and 250 μm, wherein the matrix material preferably contains nickel, cobalt or a nickel-chromium-silicon composite and the hard material particles are preferably carbide, nitride or oxide, particularly preferably tungsten carbide.

If the wear protection zone is only provided in a trailing region of the tooth edge during the conveying and conditioning process, on the one hand, less coating material is required, whereby production may be carried out more cost-effectively, and, on the other hand, a self-sharpening effect is produced by the wear of the material of the base body in the leading regions on the tooth edge.

The base body may be pre-hardened or retrospectively hardened at least in the region of the teeth, in particular by surface hardening, particularly preferably by inductive hardening.

In the method according to the invention for producing a conveying and conditioning roller for a harvesting machine having teeth comprising tooth edges provided on the surface thereof, a base body is provided with a tooth structure determining the shape of the teeth, and the base body is treated with a high energy beam in a high energy radiation method at least in the region of the tooth edges of the teeth, substantially maintaining the geometry of the tooth structure.

In this case, the structure of the material of the base body may be converted without the addition of material, in a hardening or remelting method.

Alternatively, by means of coating, build-up welding, dispersing, alloying or melting methods an additional material is incorporated into and/or applied onto the base body. In this case, for example in a build-up welding method, the base body may be coated with a hard material coating by means of a high energy beam.

According to the invention, a paired arrangement of the described conveying and conditioning rollers is implemented, wherein the paired arrangement of the conveying and conditioning rollers according to one or more of the preceding claims, for conveying and conditioning harvested crop, such as maize, wheat or millet is characterized in that the two rollers are driven so as to rotate in opposing directions and a gap is provided therebetween, permitting the breaking-up of the harvested crop, and in that the two rollers have a variable rotational speed. Preferably, the rollers have roller wear protection zones which surround the rollers in a spiral-shaped manner in opposing directions.

Further advantageous features are to be derived from the claims and the following description and the drawings.

In order to illustrate the invention more clearly, it is described once again with reference to the accompanying drawings.

DESCRIPTION OF THE INVENTION

Figure 1:
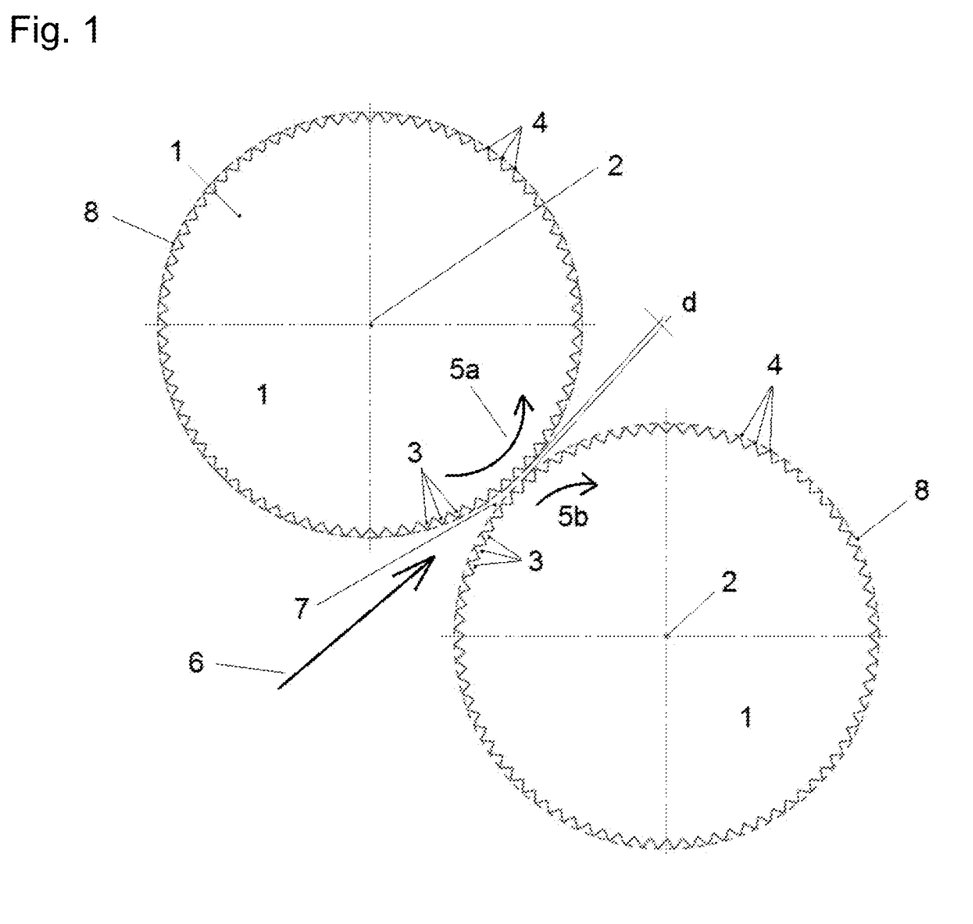
FIG. 1 shows schematically two conveying and conditioning rollers, the harvested crop being guided therethrough.

The harvested crop 6 is guided through and conditioned by the two conveying and conditioning rollers 1.

The conveying and conditioning rollers 1 shown in FIG. 1 have the same diameter which is generally 150 to 350 mm. The length of the conveying and conditioning rollers 1 is generally 500 to 1000 mm. The rotational axes 2 of the two conveying and conditioning rollers 1 extend in parallel. Each conveying and conditioning roller 1 comprises teeth 3 on the outer surface, the tooth edges 4 thereof extending parallel or obliquely to the longitudinal and rotational axis 2 of the conveying and conditioning roller 1. The teeth 3 may be equal-sided or saw tooth-shaped in cross section. The rollers 1 rotate in opposing directions, wherein one of the rollers 1, in FIG. 1 the upper roller, rotates at a greater rotational speed as is indicated by the longer arrow 5a in comparison with the arrow 5b. The harvested crop 6 is guided through the friction gap 7 between the rollers 1, wherein the teeth 3 of the rollers 1 ensure the transport of the harvested crop 6 and the breaking-up of the grains in the harvested crop 6.

As seen in FIG. 1, between the encasing ends 8 of the two rollers 1 which extend through the tooth edges 4 of the rollers 1 is a spacing d which should be slightly smaller than the grain size of the harvested crop 6 but nevertheless should not be so small that a blockage of the harvested crop 6 is caused. For maize, for example, the spacing d should be between 2 and 3 mm. For smaller grains of whole plants, the spacing d has to be correspondingly smaller in order to ensure the breaking-up of the grains. The wear which occurs during operation causes the rounding of the tooth edges 4. An increase in the spacing d of just one millimeter results in a portion of the grain not being broken up, even if this is only the case in partial longitudinal sections of the roller 1, and the quality of the fodder/basic material is reduced. Therefore, it is essential to keep the spacing d in an optimal range. In the case of uniform wear over the length of the rollers 1, by altering the spacing of the rotational axes 2 of the two conveying and conditioning rollers 1 the spacing d may be re-adjusted but the tooth edges 4 should also not be too blunt and in most cases during operation the teeth 3 of the conveying and conditioning rollers 1 are also subjected to variable stresses over the length, whereby in the conveying and conditioning rollers 1 of the prior art this leads to a variable level of wear over the length of the rollers 1.

Figure 2A:
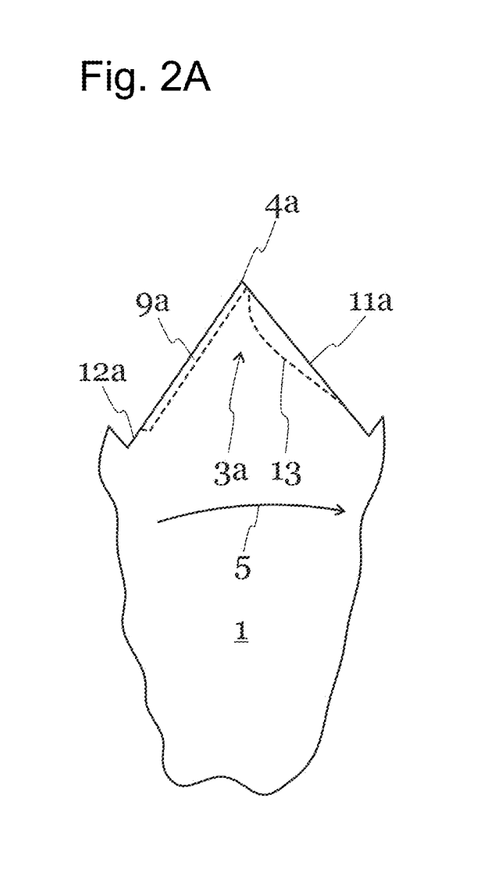
FIGS. 2a to 2c show schematically in each case a partial cross section through a conveying and conditioning roller with differently formed wear protection zones on the teeth.
Figure 2B:
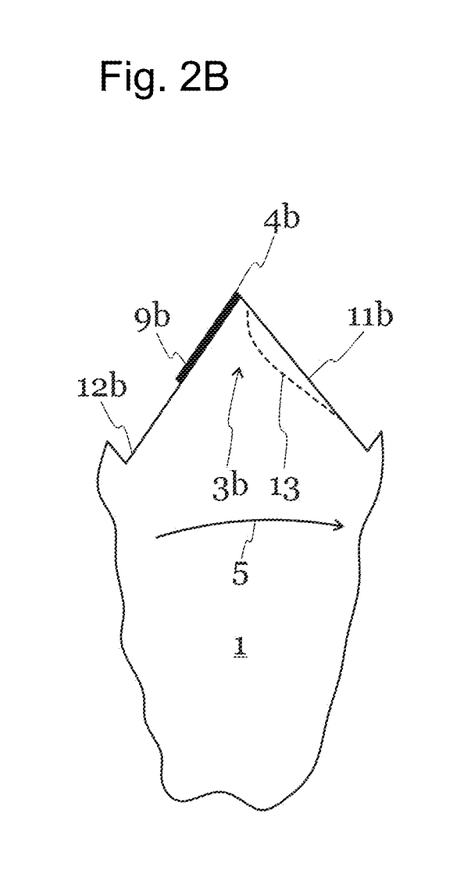
Figure 2C:
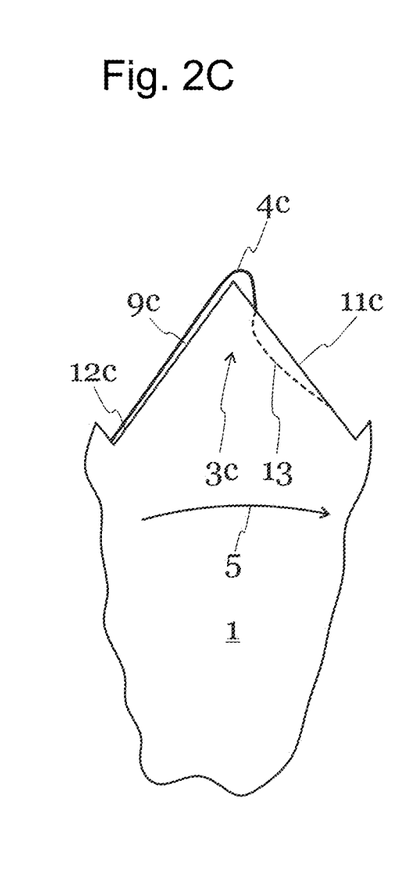

FIGS. 2a, 2b and 2c illustrate, on three teeth 3a, 3b and 3c, different tooth wear protection zones 9a, 9b and 9c on the teeth which have been produced by different high energy radiation methods. The teeth 3a, 3b and 3c have in the example shown the shape of an equilateral triangle with leading flanks 11a, 11b and 11c and trailing flanks 12a, 12b, 12c in the rotational direction 5. The teeth 3a, 3b and 3c may also be saw tooth-shaped in cross section. The base body of the conveying and conditioning roller 1 is a cylinder having the teeth 3 on its periphery and both the cylinder and the teeth 3 consist of the material of the base body. The base body may, for example, be cast or forged and preferably obtains its final shape by mechanical treatment. According to the invention, wear protection zones 9a, 9b, 9c of the teeth are produced by a high energy radiation method on the surface of the teeth 3a, 3b and 3c, at least in the region of its tooth edges 4a, 4b, 4c. In this case, the geometry of the tooth structure of the teeth 3a, 3b, 3c is not altered or is only insignificantly altered. In the tooth 3a, a wear protection zone 9a of the tooth 3a which has been produced without the addition of material is shown schematically. In this case, in the uppermost layer of the trailing flank 12a of the tooth 3a the material of the base body has been altered, for example by a hardening or remelting method.

In the teeth 3b and 3c, however, the production of the wear protection zones 9b, 9c on the teeth 3b, 3c is carried out by applying an additional material by means of a high energy radiation method. In this case, the tooth 3b has a wear protection zone 9b on the trailing flank 12b along the tooth edge 4b. The tooth 3c exhibits a wear protection zone 9c in the form of a coating which primarily extends over the trailing flank 12c of the tooth 3c and encompasses the tooth edge 4c. If the teeth 3a, 3b and 3c bear the wear protection zone 9a, 9b and 9c only or primarily on the trailing flank, without the wear protection zone 9a, 9b and 9c this leads to more rapid wear on the trailing flank 12a, 12b and 12c due to the lower wear resistance of the material of the base body in comparison with the wear resistance of the wear protection zone 9a, 9b and 9c and this results in a self-sharpening effect 13.

Preferably, the rollers will have only one of the variants of the teeth provided with a wear protection zone. However, any variants are also possible on a roller. As mentioned above, the teeth may also be configured to be saw tooth-shaped.

Figure 3:
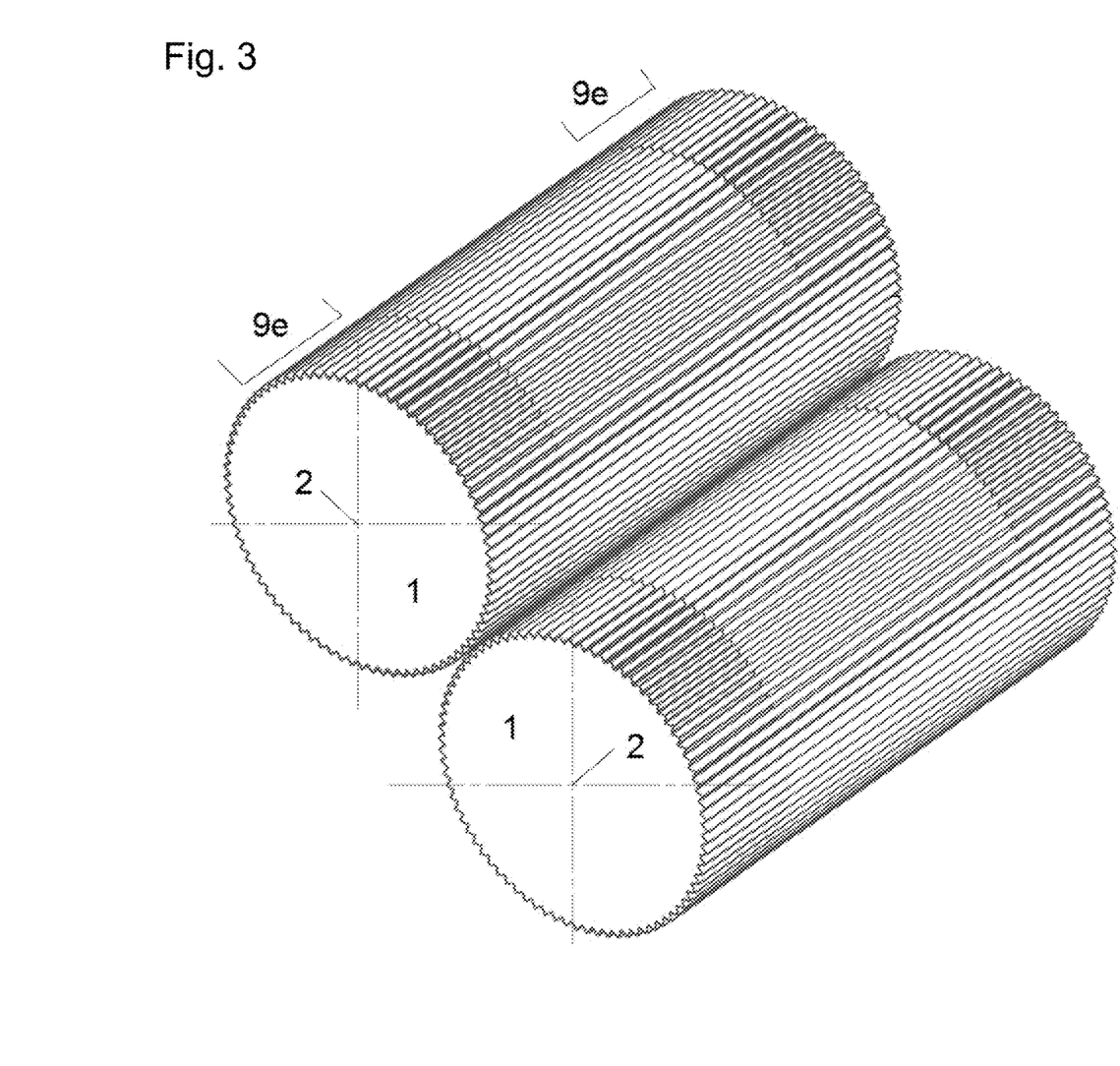
FIGS. 3, 4, and 5 show in each case two conveying and conditioning rollers in a perspective view.

FIG. 3 shows two conveying and conditioning rollers 1 with partial and/or reinforced roller wear protection zones 9e at the ends of the rollers 1 which may be provided with teeth having the tooth wear protection zones 9a, 9b and 9c in FIG. 2. According to the invention, the generally greater stress at the ends of the conveying and conditioning rollers 1 may be counteracted by a reinforced configuration of the wear protection zones 9e at the ends of the rollers 1 as indicated in FIG. 3. Thus the portions of the rollers 1 subjected to the greatest stress wear more slowly, the spacing d between the rollers 1 remains constant and the service life of the rollers 1 is increased.

Figure 4:
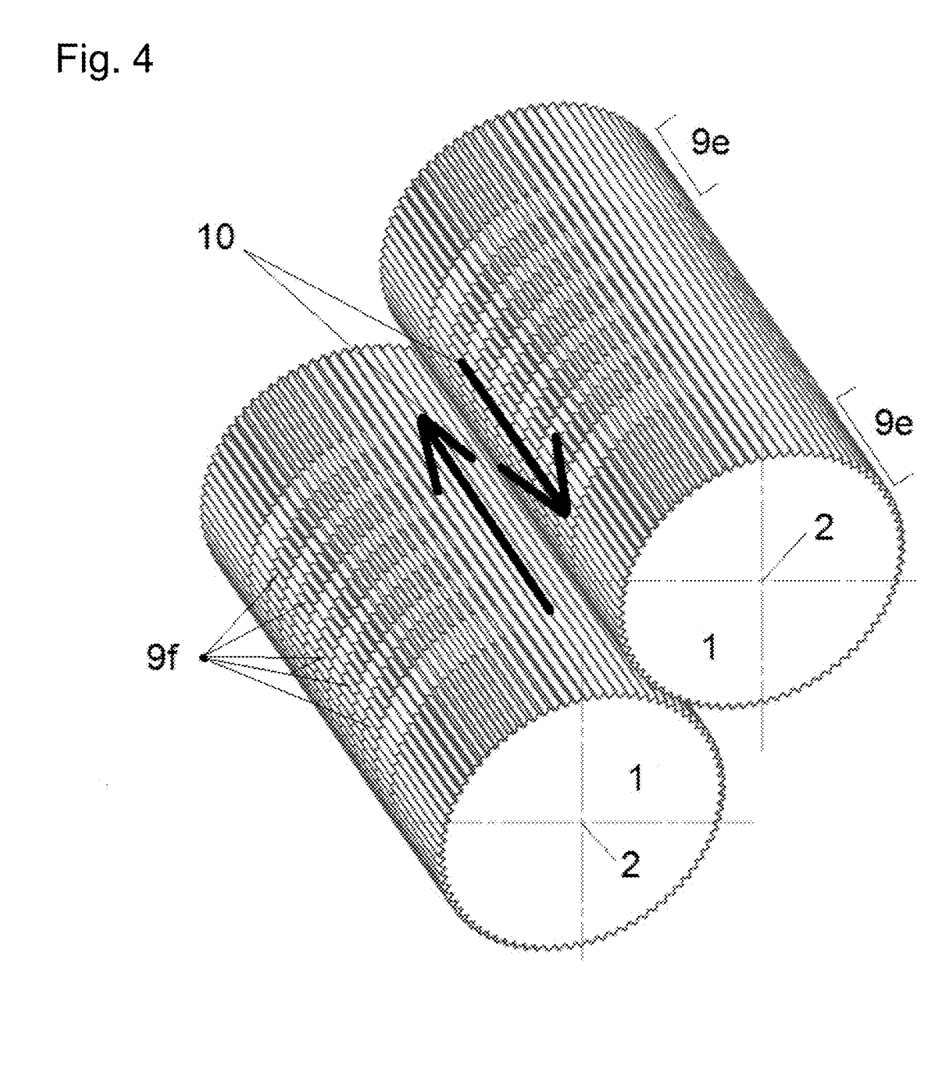

FIG. 4 also shows two conveying and conditioning rollers 1, where the wear protection zones 9e at the roller ends are configured as in FIG. 4 and/or FIG. 2 and additionally a spiral-shaped and/or reinforced roller wear protection zone 9f is applied between these wear protection zones. By the spiral-shaped wear protection zone 9f of the opposing rollers 1 or the reinforcement in this zone 9f a slight height difference is produced on the tooth edges 4 which causes an axial shearing action 10 and improves the degree of conditioning of the harvested crop 6.

The wear protection zones 9 on the teeth 3 are generally produced by high energy radiation methods and namely either without introducing additional materials in a hardening or remelting method or by incorporating or applying additional materials in a coating, build-up welding, dispersing, alloying or melting method. In particular, the wear protection zone 9 may be implemented by a hard material coating and may contain, for example, hard material particles which are embedded in a matrix material and which have a size of between 40 and 250 µm, wherein the matrix material preferably contains nickel, cobalt or a nickel-chromium-silicon composite, and the hard material particles are preferably carbide, nitride or oxide, particularly preferably tungsten carbide.

As an alternative to the disclosed hardening or hard material coating of the trailing tooth flanks 12 it may also be advantageous to harden or hard-coat the leading tooth flanks 11 but with lower wear resistance than the trailing flanks 12 in order to achieve the self-sharpening effect.

Figure 5:
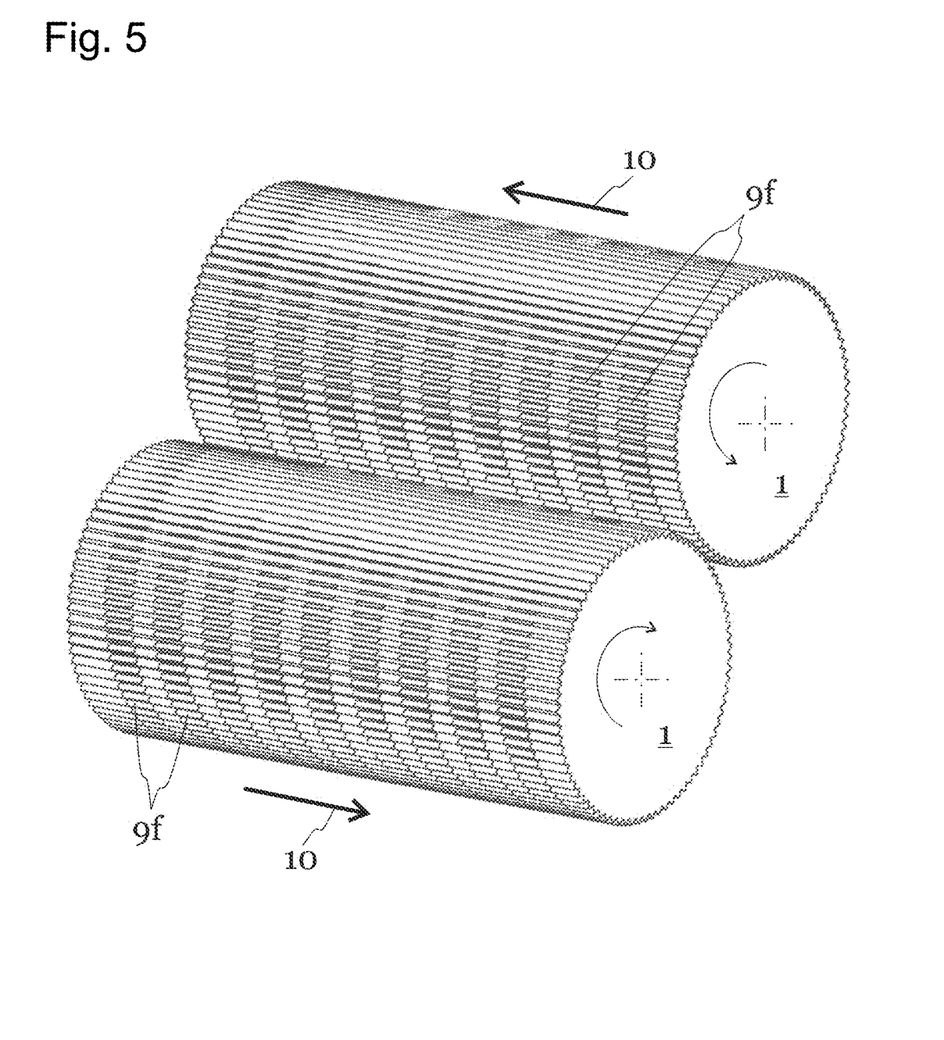

FIG. 5 shows a roller arrangement in which the roller wear protection zones 9f in each case surround the outer cylindrical surface of the rollers in a spiral-shaped manner. The greater wear of the unhardened zones between the roller wear protection zones leads to a shearing action on the harvested crop which, as a result, is effectively broken up and distributed equally over the rollers.

| List of reference numerals | |
|---|---|
| 1 | Conditioning roller |
| 2 | Rotational axes |
| 3 | Teeth |
| 4 | Tooth edges |
| 5a | Arrow (longer) |
| 5b | Arrow (shorter) |
| 6 | Harvested crop |
| 7 | Friction gap |
| 8 | Encasing end |
| 9 | Wear protection zone |
| 10 | Shearing action |
| 11 | Leading flanks |
| 12 | Trailing flanks |
| 13 | Self-sharpening effect |
| d | Spacing |

The invention claimed is:
1. A conveying and conditioning roller for a harvesting machine, the roller comprising:
a base body having a surface formed with teeth being toothed strips that extend over a longitudinal extent of the roller, each of said teeth having a leading tooth flank, a trailing tooth flank, and a tooth edge;

roller wear protection zones formed on the roller continuously or in partial regions, said roller wear protection zones having a wear resistance being greater than a wear resistance of a material of said base body of the roller;

said teeth having tooth wear protection zones formed on said trailing tooth flanks by a high energy radiation method, substantially maintaining a geometry of the tooth, said tooth wear protection zones are a hard material coating applied by a build-up welding process, said hard material coating containing hard material particles embedded in a matrix material and having a size of between 40 and 250 μm, said tooth wear protection zones defining further roller wear protection zones on the roller.

2. The conveying and conditioning roller according to claim 1, wherein said matrix material contains a material selected from the group consisting of nickel, cobalt and a nickel-chromium-silicon composite, and said hard material particles are selected from the group consisting of carbides, nitrides and oxides.

3. The conveying and conditioning roller according to claim 1, wherein said hard material particles are tungsten carbide particles.

4. The conveying and conditioning roller according to claim 1, wherein said hard material particles are arranged so as to protrude from a rapidly hardened said matrix material so as to form a rough surface.

5. The conveying and conditioning roller according to claim 1, wherein said base body is pre-hardened or retrospectively hardened at least in the region of said teeth.

6. The conveying and conditioning roller according to claim 5, wherein said base body is hardened by inductive hardening.

7. The conveying and conditioning roller according to claim 6, wherein said roller has roller wear protection zones which surround said roller in opposite directions.

8. The conveying and conditioning roller according to claim 1, wherein said leading tooth flanks have a lower wear resistance than said tooth wear protection zones.

9. The conveying and conditioning roller according to claim 1, wherein the wear resistance of said tooth wear protection zone is at least 10% greater than the wear resistance of the material of said base body.

10. The conveying and conditioning roller according to claim 1, wherein said roller wear protection zones are applied on said base body to at least one of the following regions:

a. over an entire said roller surface; or b. only in a region of a greatest wear; or c. in a spiral-shaped extent over the entire said roller surface.

11. The conveying and conditioning roller according to claim 1, wherein said hard material coating is arranged so as to encompass said tooth edge.

12. A method for producing a conveying and conditioning roller for a harvesting machine, the method comprising:

providing a base body and forming teeth on a surface thereof, teeth being toothed strips that extend over a longitudinal extent of the roller, the teeth having tooth edges and leading and trailing tooth flanks;

subsequently forming a roller wear protection zone on the roller which is continuous or divided into partial zones, the roller wear protection zone having a wear resistance that is greater than a wear resistance of a material of the base body;

wherein the base body is first produced with the teeth;

subsequently forming tooth wear protection zones on the trailing tooth flanks by a high energy radiation process, while substantially maintaining a geometry of the teeth, the tooth wear protection zones are a hard material coating applied by a build-up welding process, the hard material coating containing hard material particles embedded in a matrix material and having a size of between 40 and 250 μm, said tooth wear protection zones defining further roller wear protection zones on the roller.

\* \* \* \* \*